No. 862,176. PATENTED AUG. 6, 1907.
R. LOVE.
VALVE.
APPLICATION FILED NOV. 21, 1906.
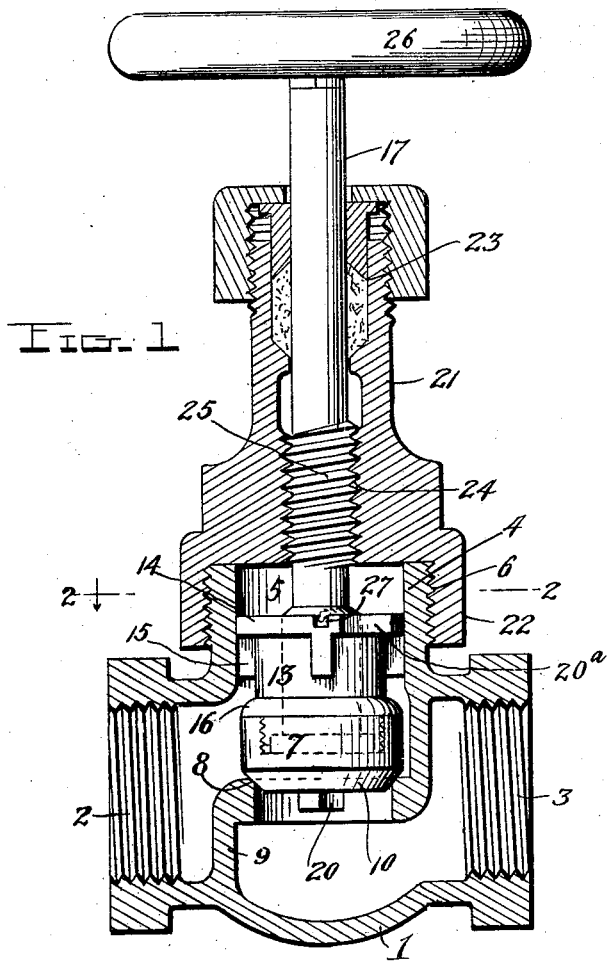
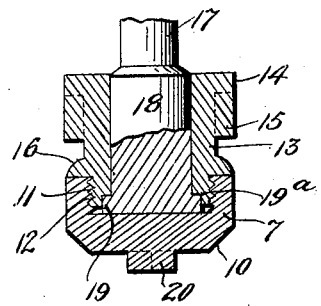
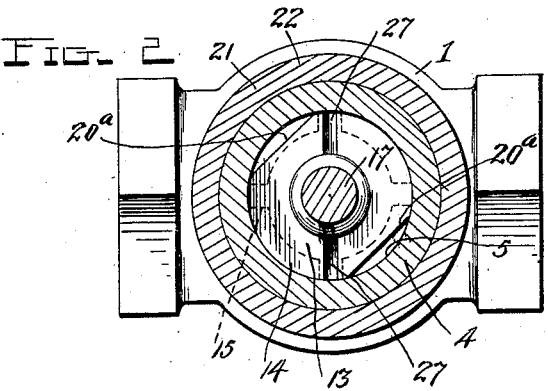
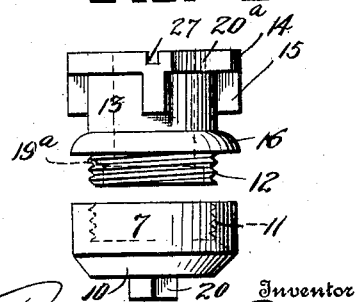
Inventor
Richard Love
By Watson E. Coleman
Attorney
Witnesses

UNITED STATES PATENT OFFICE.

RICHARD LOVE, OF ALTOONA, PENNSYLVANIA.

VALVE.

No. 862,176.  Specification of Letters Patent.  Patented Aug. 6, 1907.

Application filed November 21, 1906. Serial No. 344,502.

*To all whom it may concern:*

Be it known that I, RICHARD LOVE, a citizen of the United States, residing at Altoona, in the county of Blair and State of Pennsylvania, have invented certain new and useful Improvements in Valves, of which the following is a specification, reference being had therein to the accompanying drawing.

My invention relates to improvements in valves and more particularly to those which may be readily reground to insure their positive operation.

The object of the invention is to improve and simplify the construction and operation of valves of this character and thereby render the same more durable and efficient and less expensive.
With the above and other objects in view the invention consists of the novel construction, combination and arrangement of parts hereinafter fully described and claimed.

In the accompanying drawings: Figure 1 is a vertical, longitudinal section through a globe valve constructed in accordance with my invention; Fig. 2 is a horizontal section taken on the plane indicated by the line 2—2 in Fig. 1; and Figs. 3 and 4 are views of the valve and its combined fastening and guide member.
In the accompanying drawings I have shown my invention embodied in a globe valve, but it will be understood that it may be applied to valves of any other type. The casing 1 of the valve has at its ends an inlet 2 and an outlet 3 and at its top or upon one side a neck 4 formed with a cylindrical bore 5 and external screw threads 6. The bore 5 in the neck is adapted to serve as a guide for the valve 7 which is movable toward and from the valve seat 8 formed in a partition 9 in the casing 1. The valve 7 is in the form of a cylindrical cup-shaped body having at its bottom an annular beveled portion 10 which engages the annular valve seat 8. The interior of the valve 7 is internally screw-threaded, as shown at 11, to engage screw threads 12 upon the lower end of a combined guide and fastening member
13. The latter is in the form of a cylindrical sleeve provided at its upper end with an annular, radially projecting flange 14 of a diameter corresponding to the diameter of the bore 5 in the neck 4 of the casing, in which bore it is adapted to slide and thus guide the valve toward and from its seat. The body of the member 13 is of less diameter than that of the bore 5 and upon its outer face beneath the flange 14 are radial guide ribs 15 which also slidably engage the inner wall of the neck 4. The screw threads 12 are formed at the lower end of the member 13 immediately beneath an annular flange 16 against which the upper edge of the valve body is screwed. The valve is operated by a stem or spindle 17 which has at its lower end an enlarged portion 18 adapted to project through the bore or opening in the member 14. This enlarged portion 18 of the stem has at its lower end an integral collar or annular flange 19 which is adapted to engage an annular seat $19^a$ formed in the bottom of the member 13, as clearly shown in Fig. 3. By providing the collar or flange 19 on the stem 17, it will be seen that when the valve body is screwed upon the lower end of the member 13, these parts will be effectively secured together. In order to permit the valve body to be unscrewed from the member 13, I preferably form upon the bottom of the valve body a square or polygonal-shaped boss 20 adapted for the reception of a monkey wrench or the like, and I also preferably provide the flange 14 at diametrically opposite points with flattened portions $20^a$, as shown in Fig. 2, so that a wrench or similar tool may be effectively engaged with the member 13. The flattened portions $20^a$ of the flange 14 also afford communication between the spaces in the valve casing above and below said flange and thus equalize the pressure in said casing. The stem 17 extends through a bonnet 21 which has an enlarged, internally threaded lower end 22 adapted to engage the threads 6 upon the neck 4 of the casing. At the upper end of the bonnet 21 is provided a stuffing box 23, of well known form, for the valve stem and the central portion of said bonnet is formed with screw threads 24 adapted to receive a screw threaded portion 25 of the stem 17. A hand wheel 26 is provided upon the upper end of the stem so that when the latter is turned its threads 25 work in the threads 24 in the bonnet so that the valve may be moved toward or from its seat.

The construction, operation and advantages of the invention will be readily seen from the foregoing description, taken in connection with the accompanying drawings, and the following brief statement. When the parts are assembled, as shown in Fig. 1, and it is desired to open the valve, the handle 26 is turned in the proper direction so that as the stem moves upwardly the valve will be carried with it and away from the seat 8. When the stem is turned in the opposite direction the valve will be lowered upon its seat. When it is desired to regrind the valve and its seat, the bonnet 21 is removed from the neck 4, the valve body 7 and its member 13 are then separated and removed from the valve stem, the parts 7 and 13 are then screwed together again and replaced in the neck 4 of the valve casing. For rotating the parts 7 and 13 in the regrinding operation, I preferably employ a screw-driver bit and brace, and to enable the screw-driver to engage the member 13, I form upon the top of the latter a transverse notch or recess 27, as clearly shown in the drawings. When the valve is rotated its portion 10 and seat 8 will be ground so that they will properly fit each other, and if desired, a suitable abrasive material may be placed between them to render the grinding more effective. Owing to the provision of the guide flange 14 and ribs 15 on the valve member 13 and the sliding engagement of these parts with the interior of the neck 4 of the casing, the valve will be held in perfect alinement with its seat, not only during the grinding operation, but also when its stem is attached to it and the valve is opened or closed by means of said stem. This construction produces perfect alinement between its valve and seat at all times and enables the valve to be rotated while in alinement with its seat, and thus ground to insure perfect fitting. When the neck of the valve casing is trued up on both its inside and outside, a reseating machine can be centrally fastened to the casing when it becomes necessary to entirely recut the valve seat.

It will be noted that the device is simple in construction, so that it may be made at a small cost and its parts are not liable to become disconnected or disarranged. It will be further noted that valves, when constructed in accordance with my invention, may be reground without disconnecting them from the pipes or the like to which they are connected, and that in taking the valve apart or opening it, no tools are required other than a monkey wrench.

Having thus described my invention, what I claim as new and desire to secure by Letters Patent of the United States, is:—

1. A valve comprising a casing formed with a neck having a cylindrical bore and with a partition having a valve seat arranged in alinement with said bore, a bonnet upon said neck, a valve stem in said bonnet and a valve removably connected to the inner end of said stem and consisting of a lower section to engage said valve seat and an upper guide section to slidably engage the cylindrical bore in the neck of the casing, said sections of the valve being detachably connected to permit of the removal of the stem, and the upper guide section of the valve having means for the engagement of a rotating tool whereby the two sections of the valve may be rotated to grind the valve upon its seat when its stem is removed therefrom, substantially as set forth.

2. A valve comprising a casing formed with a neck having a cylindrical bore and with a partition having a valve seat arranged in alinement with said bore, a bonnet upon said neck, a valve stem in said bonnet and having an enlargement at its inner end, and a valve removably mounted upon the inner end of said stem and consisting of a lower section to engage said valve seat and an upper guide section to slidably engage the cylindrical bore in the neck of the casing, said sections of the valve having a detachable screw threaded connection whereby they may be clamped upon or removed from the enlargement on the inner end of the valve stem, said valve sections also having means for the application of a wrench or the like, and said upper guide section of the valve having means for the engagement of a rotating tool when the stem is removed from the valve, whereby the two sections of the valve may be rotated to grind the lower section upon said valve seat, substantially as set forth.

3. A valve comprising a casing having at its ends an inlet and an outlet and upon one side an exteriorly screw threaded neck formed with a cylindrical bore, said casing being also formed with a partition having a valve seat in alinement with said neck, a bonnet engaged with the threaded portion of said neck, a valve stem extending through said bonnet and having a threaded engagement therewith, the inner end of said stem being formed with an annular flange, a cylindrical guide member having a central opening to receive the lower end of the valve stem and a recess in its bottom to receive the annular flange on said stem, said member having upon its exterior an annular flange and radial ribs for sliding engagement with the bore of said neck, said flange having flattened portions to receive a wrench and notches to receive a rotating tool or instrument, said guide member being also formed with an externally screw-threaded, lower end and with an annular flange adjacent to said screw threads, and a cup-shaped valve body adapted to engage said valve seat and formed with internal screw threads to engage the threads upon said guide member, said valve body being formed upon its bottom with a polygonal-shaped boss for engagement by a wrench, substantially as shown and for the purposes set forth.

In testimony whereof I hereunto affix my signature in presence of two witnesses.

RICHARD LOVE.

Witnesses:
A. L. WEAVER,
B. C. THOMPSON.